United States Patent
Surendran et al.

(10) Patent No.: US 7,660,713 B2
(45) Date of Patent: Feb. 9, 2010

(54) SYSTEMS AND METHODS THAT DETECT A DESIRED SIGNAL VIA A LINEAR DISCRIMINATIVE CLASSIFIER THAT UTILIZES AN ESTIMATED POSTERIOR SIGNAL-TO-NOISE RATIO (SNR)

(75) Inventors: Arungunram C. Surendran, Sammamish, WA (US); John C. Platt, Redmond, WA (US); Somsak Sukittanon, Seattle, WA (US); Christopher J. C. Burges, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 884 days.

(21) Appl. No.: 10/795,618

(22) Filed: Mar. 8, 2004

(65) Prior Publication Data

US 2005/0091050 A1 Apr. 28, 2005

Related U.S. Application Data

(60) Provisional application No. 60/513,659, filed on Oct. 23, 2003.

(51) Int. Cl.
*G10L 21/00* (2006.01)
(52) U.S. Cl. .................................................... 704/226
(58) Field of Classification Search ................ 704/226, 704/233
See application file for complete search history.

(56) References Cited

U.S. PATENT DOCUMENTS

2003/0236661 A1* 12/2003 Burges et al. ............... 704/205

OTHER PUBLICATIONS

McAuley et al, "Speech Enhancement Using a Soft-Decision Noise Suppression Filter," ICASSP, Apr. 1980, pp. 137-145, vol. 28.*
Martin, Rainer, "Spectral Subtraction Based on Minimum Statistics", Proc. EUSIPCO-94, 1994, pp. 1182-1185.*
Li et al (1999, Building pattern classifiers using convolutional neural networks, IJCNN '99. International Joint Conference on Neural Networks, vol. 5, Jul. 10-16, 1999 pp. 3081-3085 vol. 5).*
Robert J. McAulay and Marilyn L. Malpass, Speech Enhancement Using a Soft-Decision Noise Suppression Filter, ASSP, Apr. 1980, pp. 137-145, vol. 28.
Israel Cohen and Baruch Berdugo, Speech Enhancement for Non-Stationary Noise Environments, Signal Processing 81, 2001, pp. 2403-2418.

(Continued)

*Primary Examiner*—Angela A Armstrong
(74) *Attorney, Agent, or Firm*—Lee & Hayes, PLLC

(57) ABSTRACT

The present invention provides systems and methods for signal detection and enhancement. The systems and methods utilize one or more discriminative classifiers (e.g., a logistic regression model and a convolutional neural network) to estimate a posterior probability that indicates whether a desired signal is present in a received signal. The discriminative estimators generate the estimated probability based on one or more signal-to-noise ratio (SNRs) (e.g., a normalized logarithmic posterior SNR (nlpSNR) and a mel-transformed nlpSNR (mel-nlpSNR)) and an estimated noise model. Depending on the resolution desired, the estimated SNR can be generated at a frame level or at an atom level, wherein the atom level estimates are utilized to generate the frame level estimate. The novel systems and methods can be utilized to facilitate speech detection, speech recognition, speech coding, noise adaptation, speech enhancement, microphone arrays and echo-cancellation.

16 Claims, 12 Drawing Sheets

OTHER PUBLICATIONS

David Malah, Richard V. Cox, and Anthony J. Accardi, Tracking Speech-Presence Uncertainty to Improve Speech Enhancement In Non-Stationary Noise Environments, ICASSP, 2003.

Rainer Martin, Spectral Subtraction Based on Minimum Statistics, Proc. EUSIPCO-94, 1994, pp. 1182-1185.

Jongseo Sohn, Nam Soo Kim, and Wonyong Sung, A Statistical Model-Based Voice Activity Detection, IEEE Signal Processing Letters, Jan. 1999, pp. 1-3, vol. 6, No. 1.

Christopher M. Bishop, Neural Networks for Pattern Recognition, 1995, 482 pages, Oxford University Press.

David H. Wolpert, Stacked Generalization, Neural Networks, 1992, pp. 241-259, vol. 5, Pergamon Press.

James O. Berger, Statistical Decision Theory and Bayesian Analysis, 1980, 617 pages, Springer-Verlag, New York, New York.

Hans-Gunter Hirsch and David Pearce, The Aurora Experimental Framework for the Performance Evaluation of Speech Recognition Systems Under Noisy Conditions, ISCA ITRW ASR2000, Sep. 2000, Paris, France.

Surendran, et al., Logistic Discriminative Speech Detectors Using Posterior SNR, Int'l. Conference on Acoustics, Speech, & Signal Processing 2004, IEEE, May 17-21, 2004, 4 pages, Montreal.

* cited by examiner

SYSTEMS AND METHODS THAT DETECT A DESIRED SIGNAL VIA A LINEAR DISCRIMINATIVE CLASSIFIER THAT UTILIZES AN ESTIMATED POSTERIOR SIGNAL-TO-NOISE RATIO (SNR)

CROSS-REFERENCE TO RELATED APPLICATION(S)

This application claims the benefit of U.S. Provisional Patent Application Ser. No. 60/513,659 filed on Oct. 23, 2003 and entitled "LINEAR DISCRIMINATIVE SPEECH DETECTORS USING POSTERIOR SNR," the entirety of which is incorporated herein by reference.

TECHNICAL FIELD

The present invention generally relates to signal processing, and more particularly to systems and methods that employ a linear discriminative estimator to determine whether a desired signal is present within a received signal.

BACKGROUND OF THE INVENTION

Signal detection is an important element in many applications. Examples of such applications include, but are not restricted to, speech detection, speech recognition, speech coding, noise adaptation, speech enhancement, microphone arrays and echo-cancellation. In some instances, a simple frame level decision (e.g., yes or no) of whether a desired signal is present or absent is sufficient for the application. However, even with simple decisions, decision-making criteria or requirements can vary from application to application and/or for an application, based on current circumstances. For example, with source localization, it is typically important to employ a system that mitigates rendering false positives or false detections (classifying a noise-only frame as a speech frame), whereas in speech coding a high speech detection rate (e.g., rendering true positives) at the cost of an increased number of false positives commonly is acceptable and desirable.

In other instances, a simple determination of whether a desired signal is present or absent is insufficient. With these applications, it is often necessary to estimate a probability of the presence of speech in one or more frames and/or associated time-frequency bins (atoms, units). A threshold can be defined and utilized in connection with the estimated probability to facilitate deciding whether the desired signal is present. An ideal system is one that generates calibrated probabilities that accurately reflect the actual frequency of occurrence of the event (e.g., presence of a desired signal). Such a system can optimally make decisions based on utility theory and combine decisions from independent sources utilizing simple rules. Furthermore, the ideal system should be simple and light on resource consumption.

Conventionally, many signal detection approaches that detect the presence of a desired signal or estimate its probability at the frame level have been proposed. One popular technique is to utilize a likelihood ratio (LR) test that is based on Gaussian, or normal distribution models. For example, a voice activity detector can be implemented utilizing an LR test. Such a voice activity detector typically employs a short-term spectral representation of the signal. In some implementations of this idea, a smoothed signal-to-noise ratio (SNR) estimate of respective frames can be used as an intermediate representation. Unfortunately, this technique, as well as other LR-based techniques, suffers from threshold selection and LR scores do not easily translate to true class probabilities. In order to convert from LR scores to true class probabilities, additional information such as prior probabilities of the hypotheses, for example, are required. Furthermore, such techniques typically assume that both the noise and the desired signal (e.g., speech) have normal distributions with zero mean, which can be an overly restrictive assumption. Conventional techniques that attempt to improve LR tests employ larger mixtures of models, which typically are computationally expensive.

Some detection systems render desired signal/no desired signal decisions at the frame level (e.g., they estimate a 0/1 indicator function) and smooth the decisions over time to arrive at a crude estimate of the probabilities. Some of these techniques utilize hard and/or soft voting mechanisms on top of the indicator functions estimated at the time-frequency atom level. A technique that is frequently utilized to estimate probabilities is a linear estimation model: $\rho = A + BX$; where $\rho$ is the probability, X is the input (e.g., one or more LR scores or observed features like energies), and A and B are the parameters to be estimated. One such probability estimator, even though not explicitly formulated this way, adopts the linear model and utilizes the log of smoothed energy as the input. However, this linear model can render probabilities greater than 1 or less than 0 and a variance of error in estimation depends on the input (e.g., one or more variables).

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that provide signal (e.g., speech) detection using linear discriminative estimators based on a signal-to-noise ratio (SNR). An SNR is a measure of how noisy the signal is. As described above, in many signal detection cases simple detection (e.g., presence or absence) of a desired signal is not sufficient, and it is often necessary to estimate a probability of presence of the desired signal. The present invention overcomes the aforementioned deficiencies of conventional signal detection systems by providing systems and methods that employ linear discriminative estimators, wherein a logistic regression function(s) or a convolutional neural network(s), for example, is utilized to estimate a posterior probability that can be utilized to determine whether the desired signal is present in a frame (segment) and/or a respective frequency atom(s) (bin(s), unit(s)).

In general, the systems and methods utilize calibrated scores to define a desired level of performance and a logarithm of an estimated signal-to-noise ratio (e.g., nlpSNR and mel-nlpSMR) as input. In addition, the systems and methods incorporate spectral and temporal correlations and are configurable for either uni-level or multi-level architectures, which provides customization based on application needs and user desires. The multi-level architectures may use other signal representations (e.g., partial decisions and external features) as additional input. The foregoing novel systems and methods can be utilized in connection with applications such as speech detection, speech recognition, speech coding, noise adaptation, speech enhancement, microphone arrays and echo-cancellation, for example.

In one aspect of the present invention, a signal detection system that comprises an input component and a signal detection component is provided. The input component receives signals and transforms received signals into respective feature sets. The signal detection component determines whether a desired signal is present in a received signal, based at least in part on an associated feature set.

In another aspect of the present invention, a signal detection system comprising an input component, a model generator, a signal detection component, and an algorithm bank is provided. The input component can be utilized to receive signals that can include a desired signal and noise and determine a corresponding feature set based on a signal-to-noise ratio (SNR) (e.g., an estimated posterior SNR) associated with the desired signal. In order to compute this SNR, the model generator can be utilized to provide estimated noise via minima tracking and/or previous outputs from the signal detection component. Depending on a desired level of resolution, a normalized logarithm of the estimated posterior SNR (nlpSNR) or a mel-nlpSNR can be generated. This estimated SNR can be utilized to determine a probability indicative of whether the desired signal is present in the received signal. The probability can be determined via a logistic regression model, a convolutional neural network, as well as other classifiers, to render an estimated probability of a presence of the desired signal in the received signal. This probability can be utilized to render a decision, for example, by applying a thresholding technique. The foregoing can be utilized in connection with uni-level and bi-levels detection systems, which determine the aforementioned estimated probability at the frame level and atom/frame level, respectively.

In other aspects of the present invention, a signal enhancement system, methodologies that detect and enhance desired signals, and graphs illustrating exemplary results are provided. The enhancement system and methodology additionally include a logic unit that accepts the received signal and noise model, and generates an estimated clean desired signal. The graphs illustrate results from experiments executed at various SNRs for systems and methods employing the novel aspects described herein.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
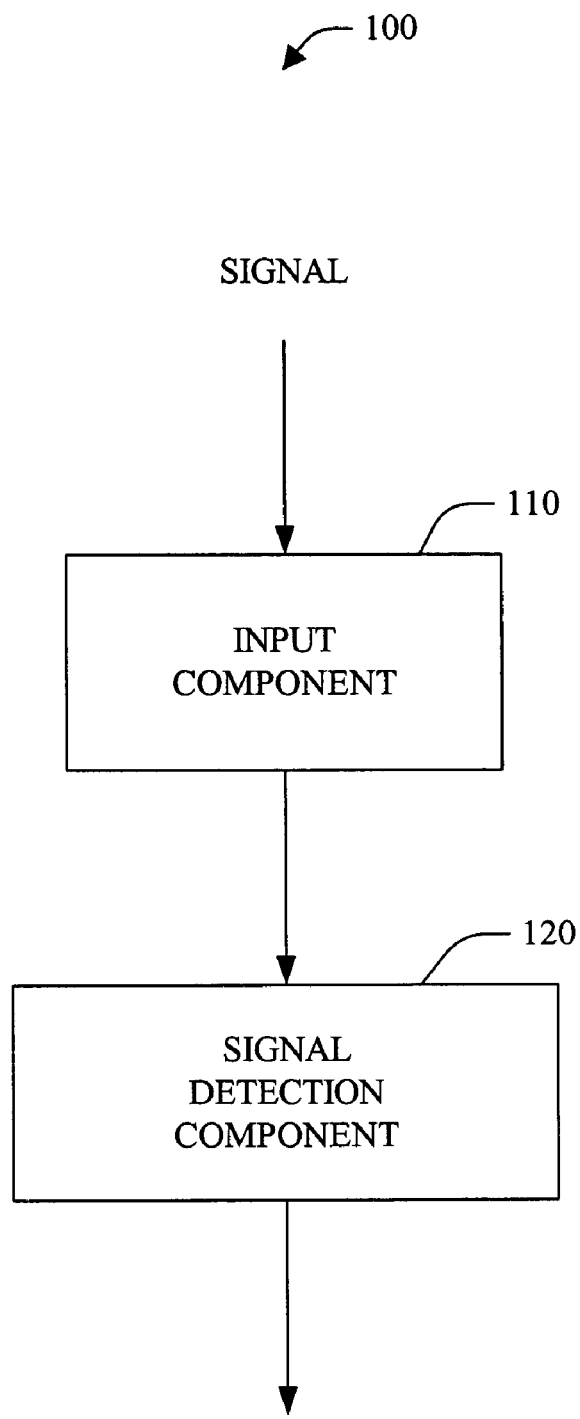
FIG. 1 illustrates an exemplary signal detection system that determines a presence of a desired signal in a received signal.

The present invention provides a simple and effective solution for signal detection and enhancement. The novel systems and methods estimate a probability of a presence of a desired signal in a received signal at a frame level and/or a bin (atom) level via at least one discriminative classifier (e.g., logistic regression-based and convolutional neural network-based classifiers) and based on an estimated posterior signal-to-noise ratio (SNR) (e.g., a normalized logarithm posterior SNR (nlpSNR) and a mel-nlpSNR). The novel systems and methods can be employed to facilitate speech detection, speech recognition, speech coding, noise adaptation, speech enhancement, microphone arrays and echo-cancellation, for example.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a system 100 that determines a presence of a desired signal in a received signal. The system 100 comprises an input component 110 that receives signals and a signal detection component 120 that detects whether a received signal includes a desired signal. The input component 110, upon receiving a signal, can transform the received signal into a feature set and/or generate an associated feature set. The input component 110 can convey this feature set and, optionally, the received signal to the signal detection component 120.

The signal detection component 120 can utilize the feature set and/or received signal to facilitate determining whether the desired signal is present in the received signal. Such determination (as described in detail below) can be based on an estimate of a probability that the desired signal is present in the received signal. In one aspect of the invention, the estimated probability can be based on an estimated posterior signal-to-noise ratio (SNR) (e.g., a normalized logarithmic posterior SNR (nlpSNR) and a mel-nlpSNR), which can be determined with estimated noise from a noise model. In addition, the estimated probability can be determined via a classifier such as a linear discriminative classifier (e.g., logistic regression and convolutional neural network). It is to be appreciated that the system 100 can be utilized to facilitate speech detection, speech recognition, speech coding, noise adaptation, speech enhancement, microphone arrays and echo-cancellation, for example.

Figure 2:
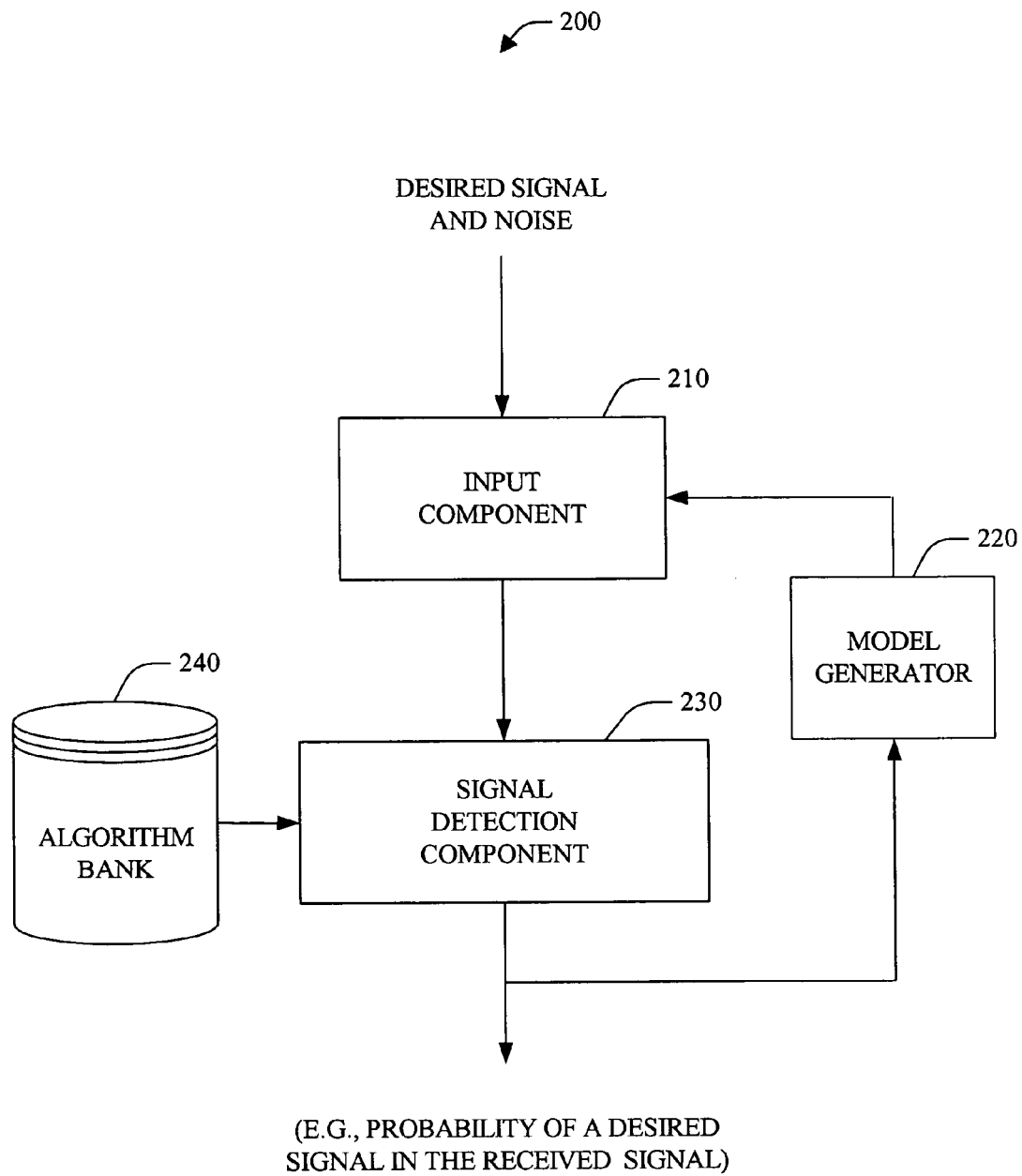
FIG. 2 illustrates an exemplary linear discriminative signal detection system that employs estimated posterior probabilities to facilitate determining a presence of a desired signal.

FIG. 2 illustrates a system 200 that detects the presence of a desired signal in a received signal. The system 200 comprises an input component 210, a model generator 220, a signal detection component 230, and an algorithm bank 240. The input component 210 can be utilized to receive signals that can include one or more desired signals and noise. The input component 210 can utilize a received signal to generate a feature set that is based on a signal-to-noise ratio (SNR). Since an actual SNR can only be known by estimating the actual desired signal and noise components of a given noisy frame, the input component 210 generates and utilizes an estimated SNR.

An estimated noise utilized to generate the estimated SNR can be provided to the input component 210 by the model generator 220, for example, via a noise model. In one instance, the model generator 220 can utilize minima tracking and/or Bayesian adaptive techniques to estimate the noise model. For example, a two-level online automatic noise tracker can be employed, wherein an initial noise estimate can be bootstrapped via a minima tracker and a maximum a posteriori estimate of the noise (power) spectrum can be obtained. It is to be appreciated that various other noise tracking algorithms can be employed in accordance with aspects of the present invention. In addition, the model generator 220 can utilize one or more outputs from the signal detection component 230 to facilitate estimating the noise model.

The input component 210 can utilize the estimated noise to determine the estimated posterior SNR ($\xi(k,t)$) via Equation 1.

$$\xi(k, t) = \frac{|Y(k, t)|^2}{\hat{\lambda}(k, t)}, \quad \text{Equation 1:}$$

wherein $\xi(k,t)$ is a ratio of energy in a given frame Y to an estimated noise energy $\hat{\lambda}$, k is a frequency index in the frame Y, and t is a time index into the frame Y. An estimated actual SNR (e.g., prior SNR) can additionally or alternatively be utilized as a feature set. A power spectrum can be computed via a transform such as a Fast Fourier Transforms (FFTs), a windowed FFT, and/or a modulated complex lapped transform (MCLT), for example. As known, the MCLT can be a particular form of a cosine-modulated filter-bank that allows for virtually perfect reconstruction.

Since a feature set can be provided to a learning machine, preprocessing can be employed to improve generalization and learning accuracy. For example, since short-term spectra of a desired signal such as speech, for example, can be modeled by a log-normal distribution, a logarithm of the SNR estimate, rather than the SNR estimate $\xi(k,t)$, can be utilized. In addition, the input can be variance normalized, for example, to one. Furthermore, respective variance coefficients can be pre-computed, for example, over a training set(s) and utilized as a normalizing factor. Thus, the feature set can be a normalized logarithm of the estimated posterior SNR (nlpSNR) as defined in Equation 2.

$$y(k, t) = \frac{1}{2\sigma(k)} \{\log|Y(k, t)|^2 - \log\hat{\lambda}(k, t)\}, \quad \text{Equation 2:}$$

where y(k,t) is the feature in a frequency-time bin (k,t) and $\sigma(k)$ is a variance-normalizing factor.

Upon generating the feature set, it can be conveyed to the signal detection component 230, which can utilize the feature set to provide an indication as to whether the desired signal is present in the received signal. Such indication can be based on an estimated probability of a presence of the desired signal in the received signal, wherein the estimated probability can be generated via logistic regression, a convolutional neural network, as well as other classifiers. Such classifiers can be stored in the algorithm bank 240 and selectively (e.g., manually or automatically) chosen and utilized, based at least in part on the application.

In one aspect of the invention, an estimated probability $\rho x$ can be determined by Equation 3.

$$\rho x = \frac{1}{1 + \exp(-A - BX)}, \quad \text{Equation 3:}$$

where X is an input and A and B are system parameters that can be estimated by minimizing a cross-entropy error function, for example, via Equation 4.

$$\varepsilon = -\sum_x tx \log(\rho og + (1 - tx)\log(1 - \rho x), \quad \text{Equation 4:}$$

where tx represents target labels for a training data X and, hence, is discriminative. Additionally, this function can provide a maximum likelihood estimate of a class probability.

Equation 3 can provide a very good estimate of a posterior probability of a membership of a class $\rho(C|X)$ for a wide variety of class conditional densities of data X. If such densities are multivariate Gaussians with equal variances, then this estimate can provide a substantially exact posterior probability; however, it is to be understood that this is not a necessary condition. Furthermore, this function can provide additional advantages over Gaussian models; for example, setting thresholds can be easier, and if the input vector X includes data from adjacent time and frequency atoms, this function can provide an efficient mechanism that can incorporate both temporal and spectral correlation into the decision without requiring an accurate match of underlying distributions. The parameters can be easily determined utilizing gradient descent-based learning algorithms. Thus, this technique can provide both richness and simplicity.

After determining the probability of the presence of the desired signal in the received signal, the probability can be utilized to render a decision. For example, the probability can be utilized to provide a Boolean (e.g., "true" and "false") or logic (e.g., 0 and 1) value or any desired indicia that can indicate a decision. This decision can be utilized to determine whether further processing should be performed on the received signal. For example, if it is determined that the desired signal is present, techniques can be employed to enhance or extract the desired signal or suppress an undesired signal. Moreover, the probability can be conveyed to the model generator 220 to facilitate creating and/or updating noise models.

Figure 3:
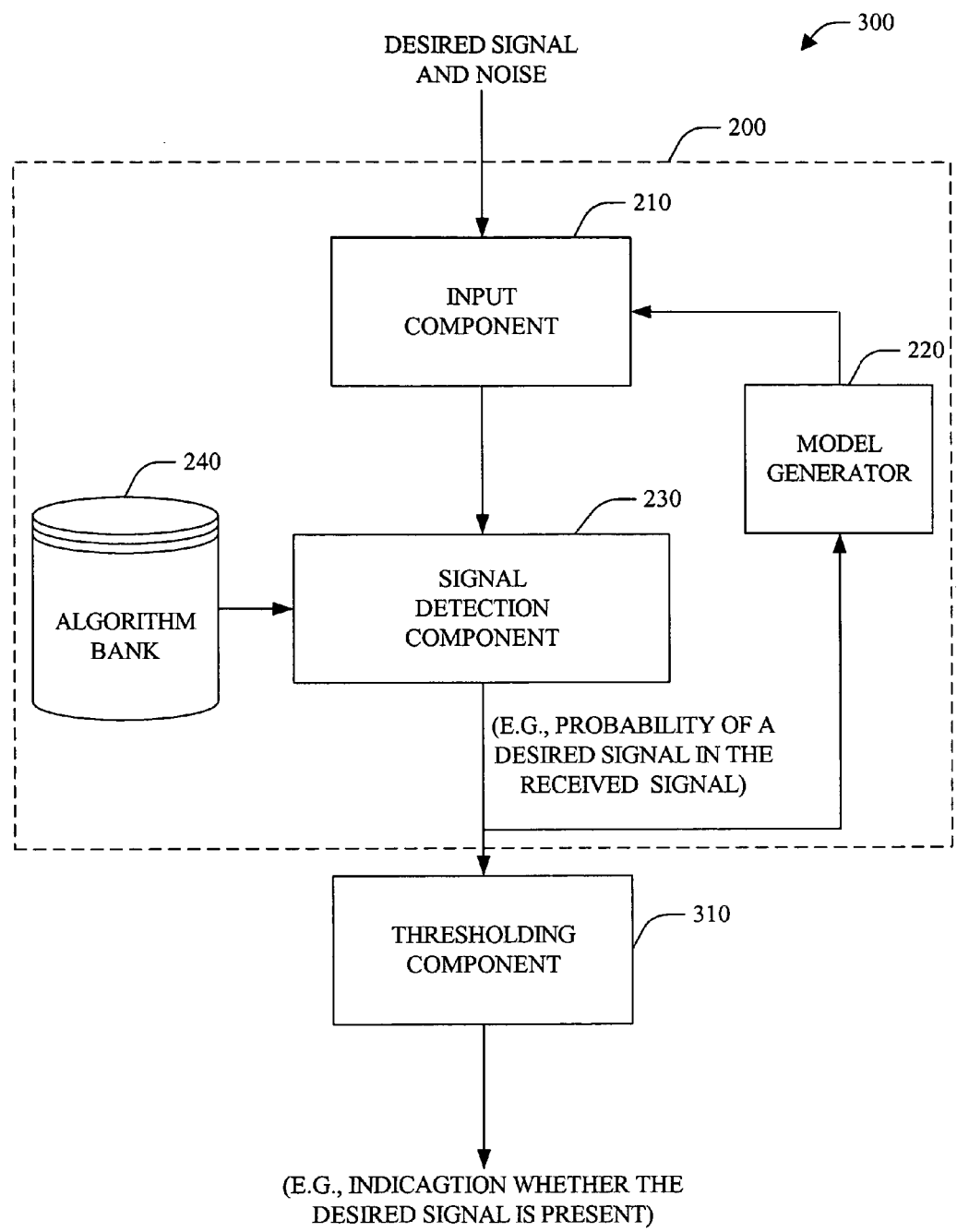
FIG. 3 illustrates an exemplary linear discriminative signal detection system that employs thresholding.

FIG. 3 illustrates a system 300 that comprises the system 200 (the input component 210, the model generator 220, the signal detection component 230 and the algorithm bank 240) and a thresholding component 310. The thresholding component 310 can be utilized to define a crossover point to compare with an estimated probability. Such comparison can be utilized to render a decision such as, for example, "true" or "false," 1 or 0, "yes" or "no," and the like. Such thresholding enables a user to define criteria that influence decision-making based on an application, a desired level of acceptable errors, a user preference, etc.

For example, a scale can be defined wherein a probability of 1 indicates a one hundred percent confidence (a certain event) that the desired signal is present; a probability of 0 can indicate a one hundred percent confidence that the desired signal is absent; a probability of 0.5 can indicate a fifty percent confidence that the desired signal is present, etc. When rendering true positives (determining the desired signal is present when in fact it is present) is more important than mitigating false positives (determining the desired signal is present when it is not present), the threshold can be set closer to 0 such that a slight probability that the desired signal is presents results in a decision that indicates the desired signal is present. However, when it is more important to mitigate false positives than render true positives, the threshold can be defined closer to 1 such that a slight probability that the desired signal is present results in a decision that indicates the desired signal is absent.

Likewise, when rendering true negatives (determining the desired signal is absent when in fact it is absent) is more important than mitigating false negatives (determining the desired signal is absent when it is present), the threshold can be set closer to 1 such that a slight probability that the desired signal is present results in a decision that indicates the desired signal is absent, and when it is more important to mitigate false negatives than render true negatives, the threshold criteria can be defined closer to 0 such that a slight probability that the desired signal is present results in a decision that indicates the desired signal is present. It is to be appreciated that the above examples are provided for explanatory purposes and do not limit the invention. Essentially, the threshold can be variously defined and customized based on the application and user needs.

Figure 4:
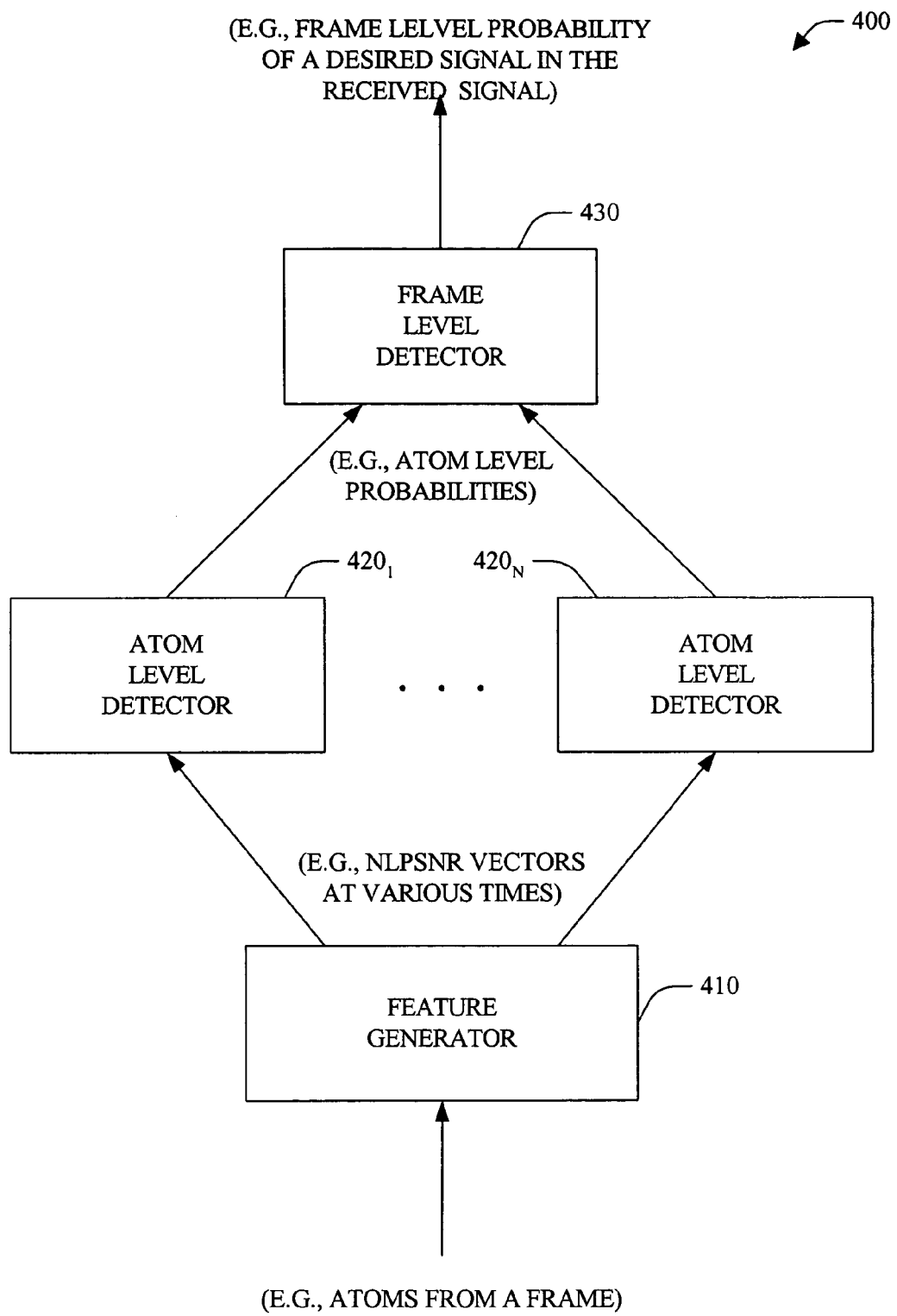
FIG. 4 illustrates an exemplary bi-level linear discriminative signal detection system.

FIG. 4 illustrates a bi-level (stacked, cascaded) signal detection system 400 that generates an estimated probability that provides an indication as to whether a desired signal is present in a received signal. The system 400 comprises a feature generator 410, N atom level detectors $420_1$-$420_N$ (hereafter detectors 420), wherein N is an integer, and a frame level detector 430 (hereafter detector 430).

Figure 5:
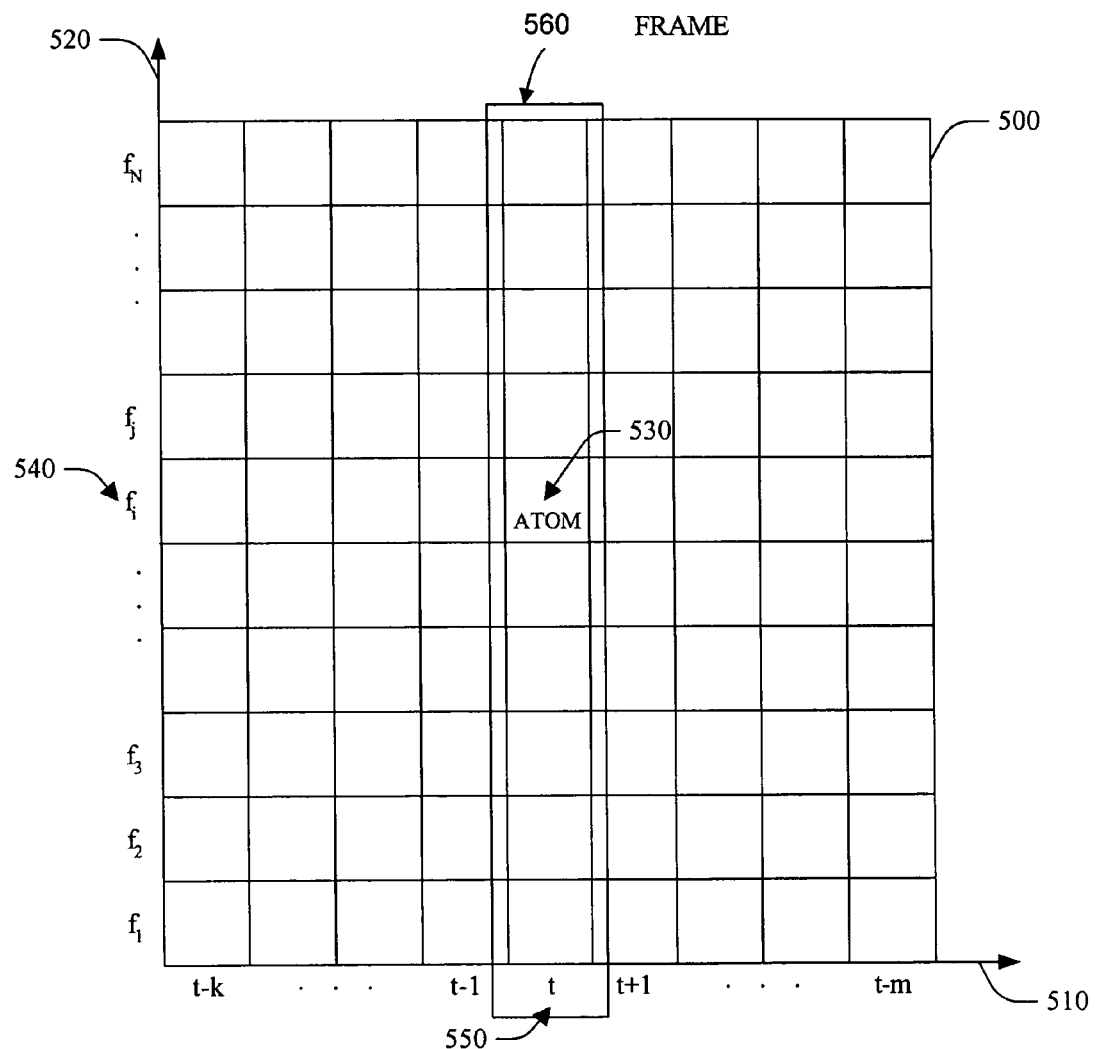
FIG. 5 illustrates an exemplary frame and atoms that can be utilized as input to determine atom level and frame level estimated posterior probabilities.

The feature generator 410 receives one or more atoms from one or more frames and transforms the atoms into a feature set(s). Referring briefly to FIG. 5, an exemplary set of frames 500 that can be employed in connection with the system 400 is depicted. The set 500 comprises a plurality of atoms (bins, units) in a time-frequency plane, wherein time is indexed in connection with a horizontal axis 510 and frequency is indexed in connection with a vertical axis 520. Respective atoms in the 500 can be indexed via frequency/time index pairs. For example, an atom 530 can be referenced by a frequency/time index pair with a frequency index ("$f_i$") 540 and a time index ("t") 550. Each frame in 500 comprises the plurality of frequency bins (atoms) fro a particular short time period around time "t." For example, frame 560 can be referenced by the time index ("t") 550.

Returning to FIG. 4, one or more frames from the set 500 are conveyed to the feature generator 410, wherein one or more estimated posterior SNR vectors are generated. Such vectors can represent atoms across frequencies (e.g., $f_1$-$f_N$) at respective times (e.g., . . . , t−1, t, t+1, . . . ) and comprise normalized logarithms of the estimated posterior SNR (nlpSNR). For example, an exemplary nlpSNR vector at time t can be represented as $\hat{t}$=[$atom_{f_1}$, $atom_{f_2}$, $atom_{f_3}$, . . . , $atom_{f_i}$, . . . , $atom_{f_N}$]. Respective nlpSNR vectors can be conveyed to the detectors 420 in the form of Equation 5.

$$y(k,t)=[y(k-a:k+a,t-i:t+i)],$$ Equation 5:

which is the concatenation of the feature y in a frequency-time bin (k,t). To mitigate any time delay in processing, if desired, the feature can be strictly causal and need not include future frames.

The nlpSNR vectors can be utilized by respective detectors 420 to generate estimated posterior probabilities P(k,t) that correspond to whether the desired signal is present in the received signal at the atom level. These atom level estimated posterior probabilities can be concatenated (e.g., via a similar technique utilized to concatenate y) and the concatenation can be conveyed to the frame detector 430. The frame detector 430 can utilize the concatenation to determine a frame level estimated posterior probability indicative of whether the desired signal is present in the received signal.

Figure 6:
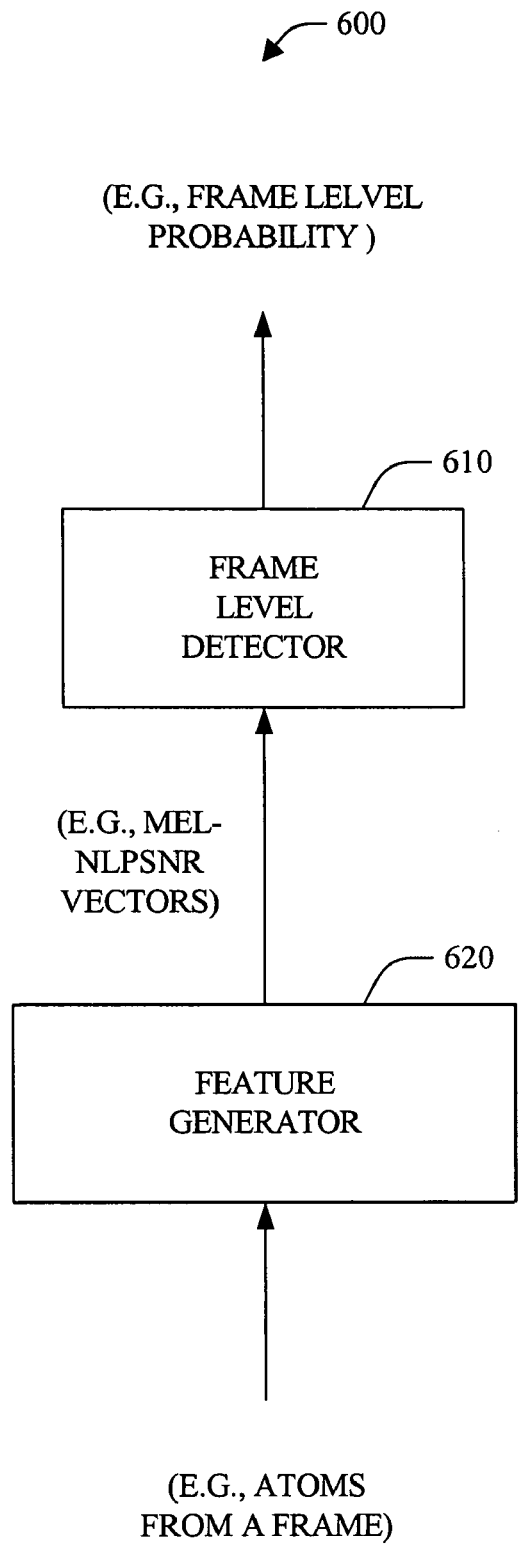
FIG. 6 illustrates an exemplary uni-level linear discriminative signal detection system.

FIG. 6 illustrates a uni-level (single, uncascaded) detection system 600 that generates an estimated posterior probability that indicates whether a desired signal is present in a received signal. Unlike the bi-level system 400, a frame level detector 610 that estimates frame level probabilities directly from feature data obtained from a feature generator 620 rather than from atom level estimated posterior probabilities generated from the atom level detectors 420.

By way of example, atoms (e.g., atom 530) from a frame (e.g., frame 560) can be conveyed to the feature generator 620. As noted above, a frame can comprise a plurality of atoms for a short time interval around the time instant t that can be indexed as frequency/time pairs (e.g., ($f_i$,t) can be utilized to index atom 530). The atoms can be utilized to generate vectors representing mel-normalized logarithms of estimated posterior SNRs (mel-nlpSNRs). In general, mel-nlpSNR's are lower in resolution than nlpSNRs. For example, both $|Y|^2$ and $\hat{\lambda}$ (as described above) can be converted into mel-band energies $M|Y|^2$ and $M\hat{\lambda}$ before an nlpSNR is generated. The corresponding feature set can be defined by Equation 6.

$$y_M(k, t) = \frac{1}{2\sigma_M(k)}\{\log M|Y(t)|^2 - \log M\hat{\lambda}(t)\}$$ Equation 6:

where $y_M(k,t)$ is the mel-based feature in a frequency-time bin (k,t) and $\sigma_M(k)$ is a mel-based variance-normalizing factor.

The mel-nlpSNR vectors can be conveyed to the frame detector 610 in a form defined by Equation 7.

$$y_M(k,t)=[y(k-a:k+a,t-i:t+i)],$$ Equation 7:

where $y_M$ is the mel-band derivative of y (described above). Input in the form of Equation 7 can be utilized by the frame level detector 610 to generate an estimated frame level probability via logistic regression, convolution, etc.

Figure 7:
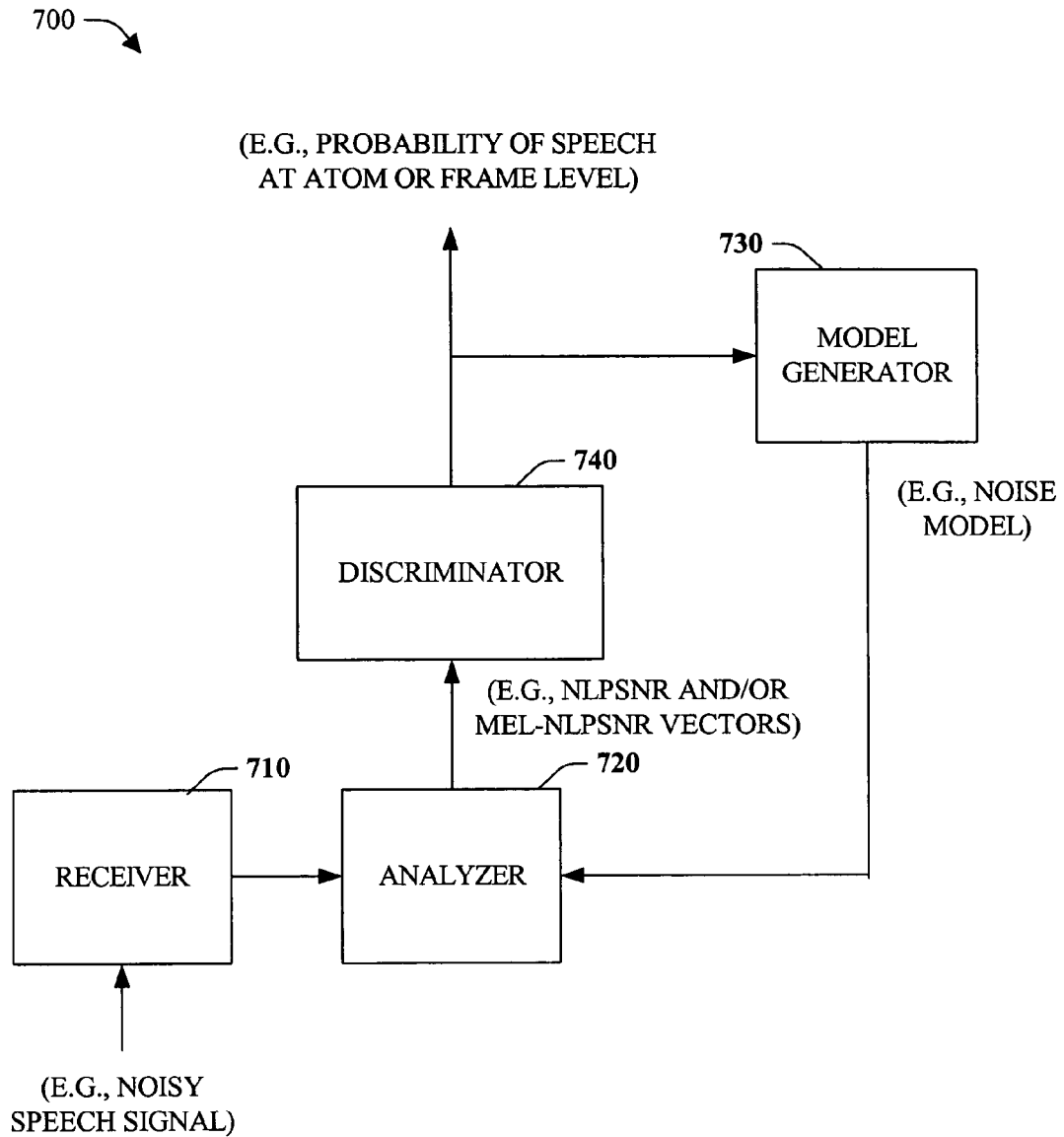
FIG. 7 illustrates an exemplary linear discriminative signal detection system.

FIG. 7 illustrates an exemplary speech detection system 700. The system 700 comprises a receiver 710 that accepts signals that can include noisy speech. Upon accepting such a signal, the receiver 710 conveys the signal to an analyzer 720 that determines an associated estimated posterior signal-to-noise ratio (SNR). Depending on whether a uni-level or a bi-level detection system is employed, the estimated posterior SNR can be an nlpSNR or a mel-nlpSNR. In addition or alternatively, an estimated actual SNR (e.g., prior SNR) can be utilized as a feature set. A power spectrum can be computed via a transform such as a Fast Fourier Transform (FFT), a windowed FFT, and/or a modulated complex lapped transform (MCLT), for example. In addition, the signal analyzer 720 utilizes a noise estimation from a noise model(s) to facilitate determining the SNR. The noise model can be generated by a model generator 730 and typically is provided to the analyzer 720 with a delay of at least one frame.

Upon determining a frame level and/or atom level estimated posterior SNR (e.g., nlpSNR and mel-nlpSNR), the analyzer 720 conveys the SNR to a discriminator 740. The discriminator 740 can employ various techniques to estimate a posterior probability that speech is present in the received signal. As described in detail above, the discriminator 740 can employ a logistic regression or convolutional neural network approach, for example. In addition, the estimation can be performed at the frame level and/or the atom level, wherein the results at the atom level can be utilized to generate a more refined frame level estimation.

The output of the discriminator 740 is an estimated posterior probability that speech is present in the received signal. This output can be utilized to render a decision based on criteria that defines a decision-making probability level. In addition, the discriminator 740 can convey the output to the model generator 730, wherein the estimated posterior probability is utilized to facilitate creating a noise model or refining an existing noise model. The model generator 730 can provide the new or updated noise model to the analyzer 720 to be utilized as described previously. Thus, the analyzer 720 can utilize the new or updated noise model to facilitate determining SNRs. The new or updated SNR generally improves SNR determination. In addition, the model generator 730 can provide the noise model to various other components for further analysis, processing and/or decision-making.

Figure 8:
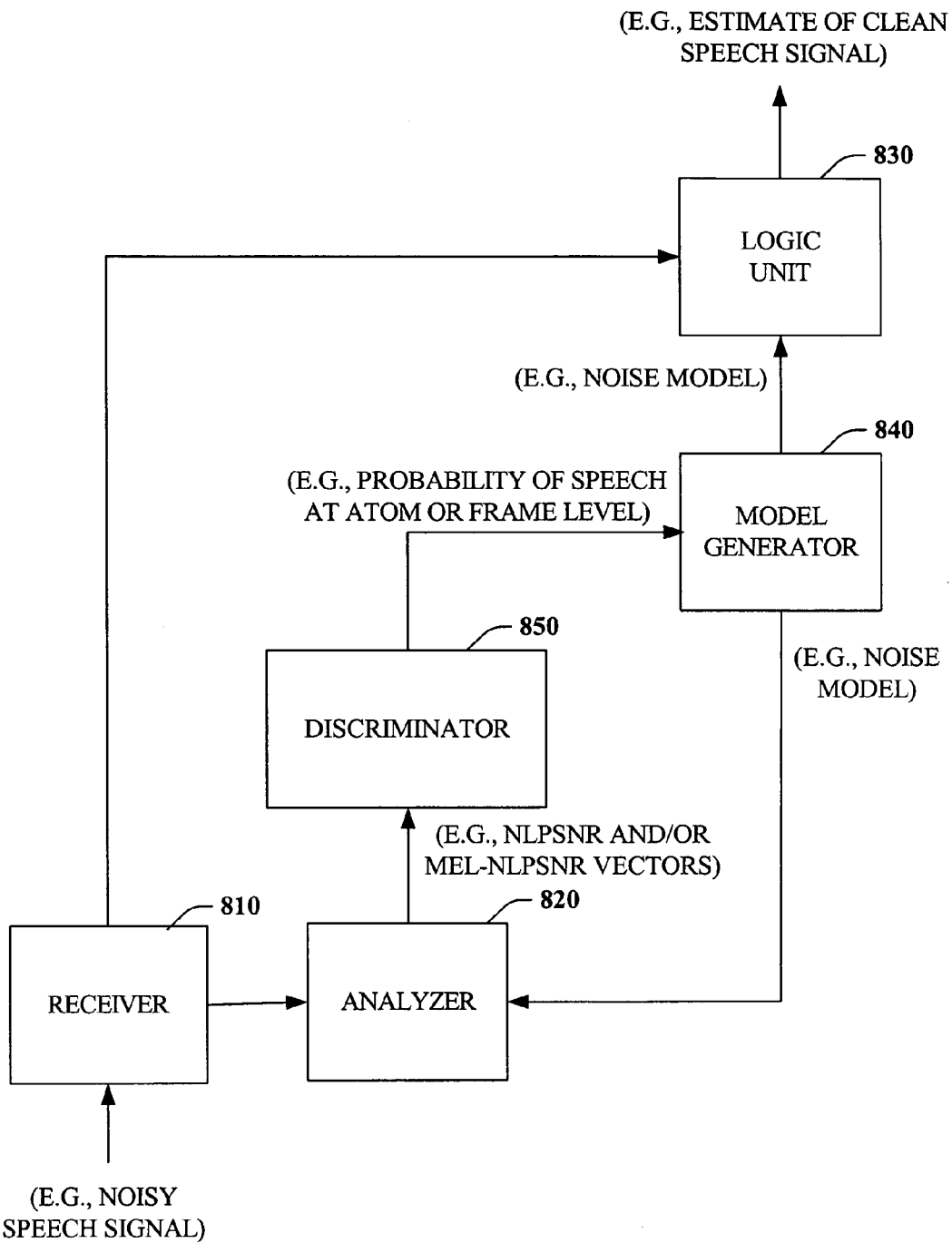
FIG. 8 illustrates an exemplary linear discriminative signal enhancement system.

FIG. 8 illustrates an exemplary system 800 that enhances speech. The system 800 comprises a receiver 810, an analyzer 820, a logic unit 830, a model generator 840, and a discriminator 850. The receiver 810 receives signals that can comprise at least a desired signal and noise. Upon receiving a signal, the receiver 810 can provide the signal to the analyzer 820 and the logic unit 830. The analyzer 820 utilizes the signal to generate features such as atom level and/or frame level estimated posterior signal-to-noise ratios (SNRs). Depending on whether a uni-level or a bi-level enhancement system is employed, estimated posterior SNRs can be nlpSNRs or mel-nlpSNRs. In addition or alternatively, an estimated actual SNR (e.g., prior SNR) can be utilized as a feature set. Such SNRs typically are generated with estimated noise from a noise model provided by the model generator 840. A power spectrum can be computed via a transform such as a Fast Fourier Transform (FFT), a windowed FFT, and/or a modulated complex lapped transform (MCLT), for example.

Upon determining an estimated posterior SNR (e.g., nlpSNR and mel-nlpSNR), the analyzer 820 can convey the SNR to the discriminator 850, which can estimate a posterior probability that speech is present in the received signal. Various techniques can be employed to estimate the posterior probability such as linear discriminators (e.g., logistic regression and convolutional neural network). The estimated posterior probability can be conveyed to the model generator 840, wherein it can be utilized to facilitate creating a noise model or refining an existing noise model. The model generator 840 can provide the new or updated noise model to the analyzer 820 and to the logic unit 830.

The analyzer 820 can utilize the new or updated noise model to facilitate determining SNRs. The logic unit 830 can utilize the noise model and the received signal, which can be provided by the receiver 810, to provide an estimate of a clean speech signal. For example, the logic unit 830 can compute a gain, and utilize the gain to enhance the speech. The enhanced speech can be output.

Figure 9:
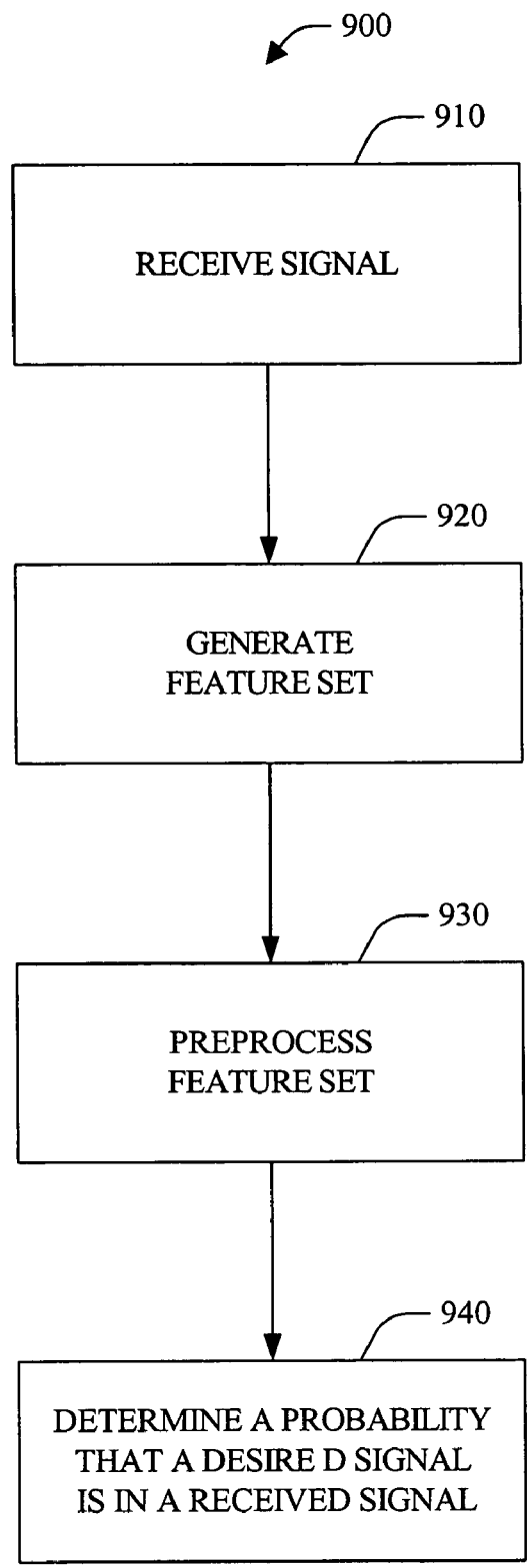
FIG. 9 illustrates an exemplary linear discriminative signal detection methodology.
Figure 10:
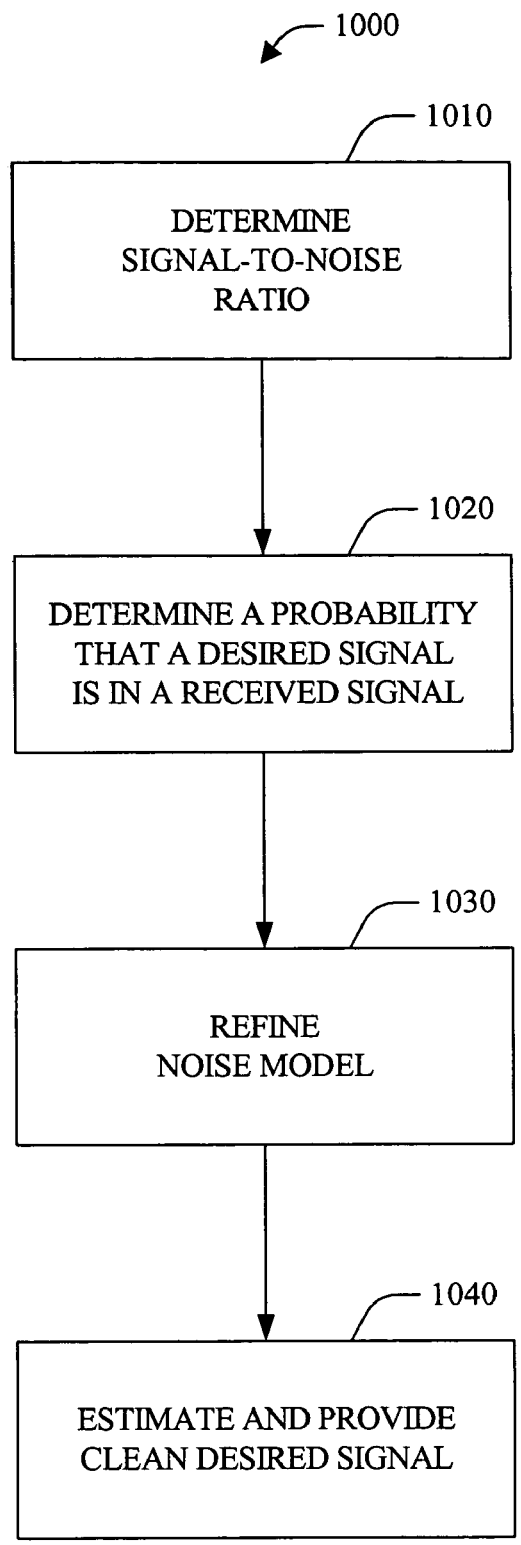
FIG. 10 illustrates an exemplary linear discriminative signal enhancement methodology.

FIGS. 9-10 illustrate document annotation methodologies 900 and 1000 in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement the methodologies in accordance with the present invention. In addition, those skilled in the art will understand and appreciate that the methodologies could alternatively be represented as a series of interrelated states via a state diagram or events.

FIG. 9 illustrates a methodology 900 that facilitates determining whether a desired signal is present in a received signal. Proceeding to reference numeral 910, a signal is received that includes a desired signal and noise. At 920, the received signal is utilized to construct a feature set. In one aspect of the present invention, the feature can be based on an estimated posterior signal-to-noise ratio (SNR) associated with the desired signal. Estimated noise for computing the estimated posterior SNR can be obtained from a noise model that can be determined via minima tracking, or one or more probabilities. For example, a two-level online automatic noise tracker can be employed, wherein an initial noise estimate is bootstrapped via a minima tracker and a maximum a posteriori estimate of the noise (power) spectrum can be obtained. With the estimated noise, the estimated posterior SNR can be determined, as described in detail above. In addition to or alternatively, an estimate of an actual SNR (e.g., prior SNR) can be utilized as a feature. The power spectrum can be computed via a transform such as a Fast Fourier Transform (FFT), a windowed FFT, and/or a modulated complex lapped transform (MCLT), for example.

At reference numeral 930, the estimated posterior SNR can be preprocessed. In one aspect of the invention, since short-term spectra can be modeled by a log-normal distribution, a logarithm of the estimate posterior SNR can be utilized rather than the estimated posterior SNR. In addition, an associated variance can be normalized to one. Furthermore, variance coefficients can be pre-computed, for example, over a training set(s) and utilized as a normalizing factor. The foregoing provides for a feature set that can be referred to as a normalized logarithm of the estimated posterior SNR (nlpSNR). This feature set is generally employed when atom level detection is desired to improve resolution. The results from the atom level detection can then be employed for frame level detection. When atom level detection is not desired, a mel-normalized logarithm of the estimated posterior SNR (mel-nlpSNR) can be determined and employed to generate a frame level estimated posterior SNR.

At reference numeral 940, the SNR is utilized to determine a probability that the desired signal is in the received signal. It is to be appreciated that a logistic regression model, a convolutional neural network, as well as other classifiers, can be employed to facilitate estimating this probability. The estimated probability can be utilized to render a decision as to whether the desired signal is present. For example, thresholding can be utilized to render a decision such as "true" or "false," 1 or 0, "yes" or "no," and the like, which indicate whether or not the desired signal is present. It is to be appreciated that the methodology 900 can be employed to facilitate speech detection, speech recognition, speech coding, noise adaptation, speech enhancement, microphone arrays and echo-cancellation, for example.

FIG. 10 illustrates an exemplary speech enhancement methodology 1000. At reference numeral 1010, a signal with a desired signal (e.g., speech) and noise is received, and an estimated posterior signal-to-noise ratio (SNR), such as a normalized logarithmic posterior SNR (nlpSNR) and a mel-transformed nlpSNR (mel-nlpSNR), for example, is determined. A noise model, delayed by one frame, for example, can be utilized to facilitate determining the SNR. At reference numeral 1020, the estimated posterior SNR is utilized to estimate a posterior probability that speech is present in the received signal. As described in detail above, logistic regression or a convolutional neural network approach, for example, can be employed to facilitate determining such probability. Moreover, the probability can be computed at a frame level and/or an atom level, wherein the results of the atom level can be utilized to render the frame level probability. At 1030, the estimated posterior probability can be utilized to create a new and/or refine an existing noise model. The new or updated noise model can be utilized to facilitate determining an estimated posterior probability for the next received signal. At reference numeral 1040, the received signal and the noise model can be utilized to determine a gain and enhance the desired signal. An estimate of a clean desired signal can then be output.

Figure 11:
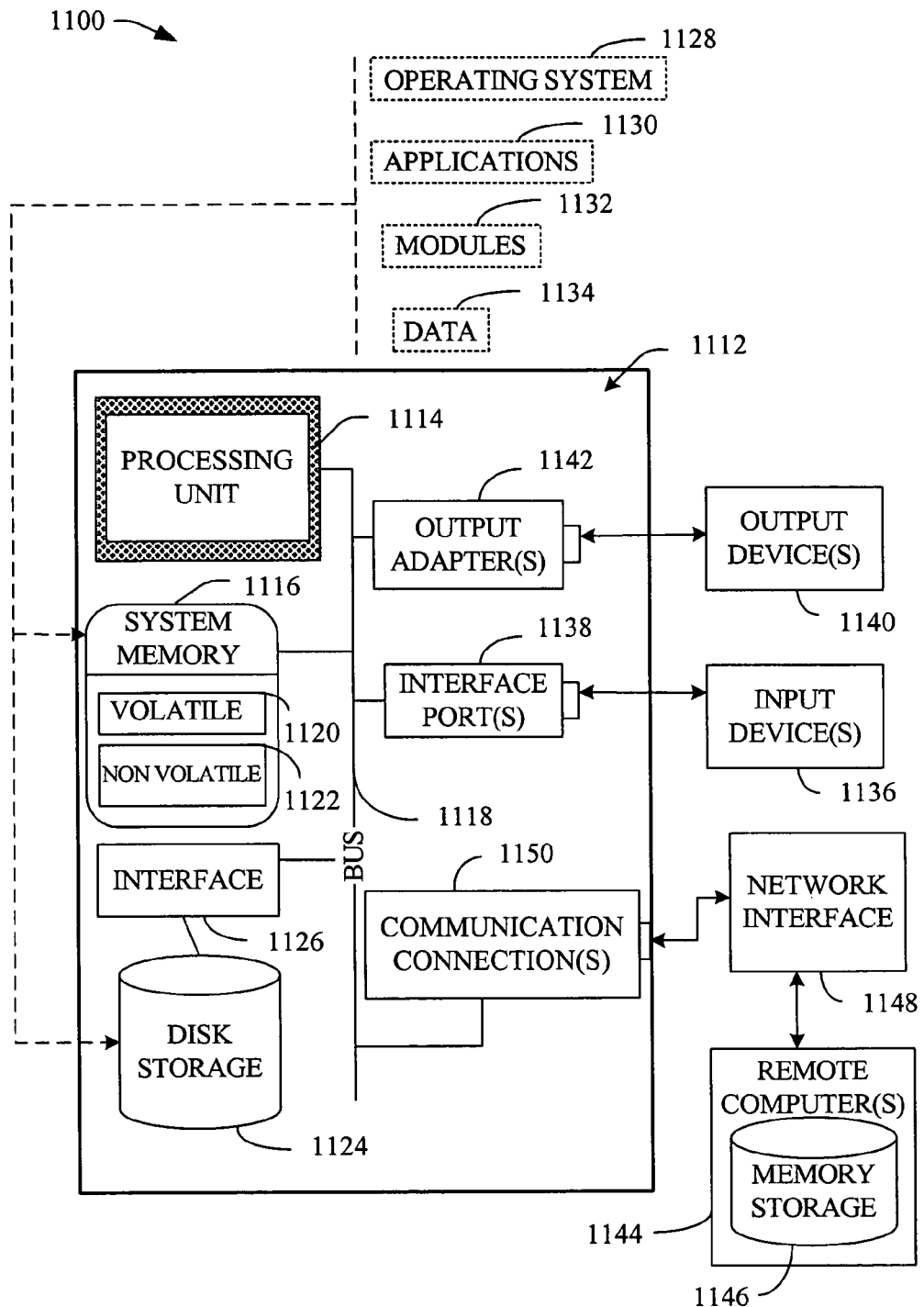
FIG. 11 illustrates an exemplary operating environment that can be employed in connection with the novel aspects of the invention.
Figure 12:
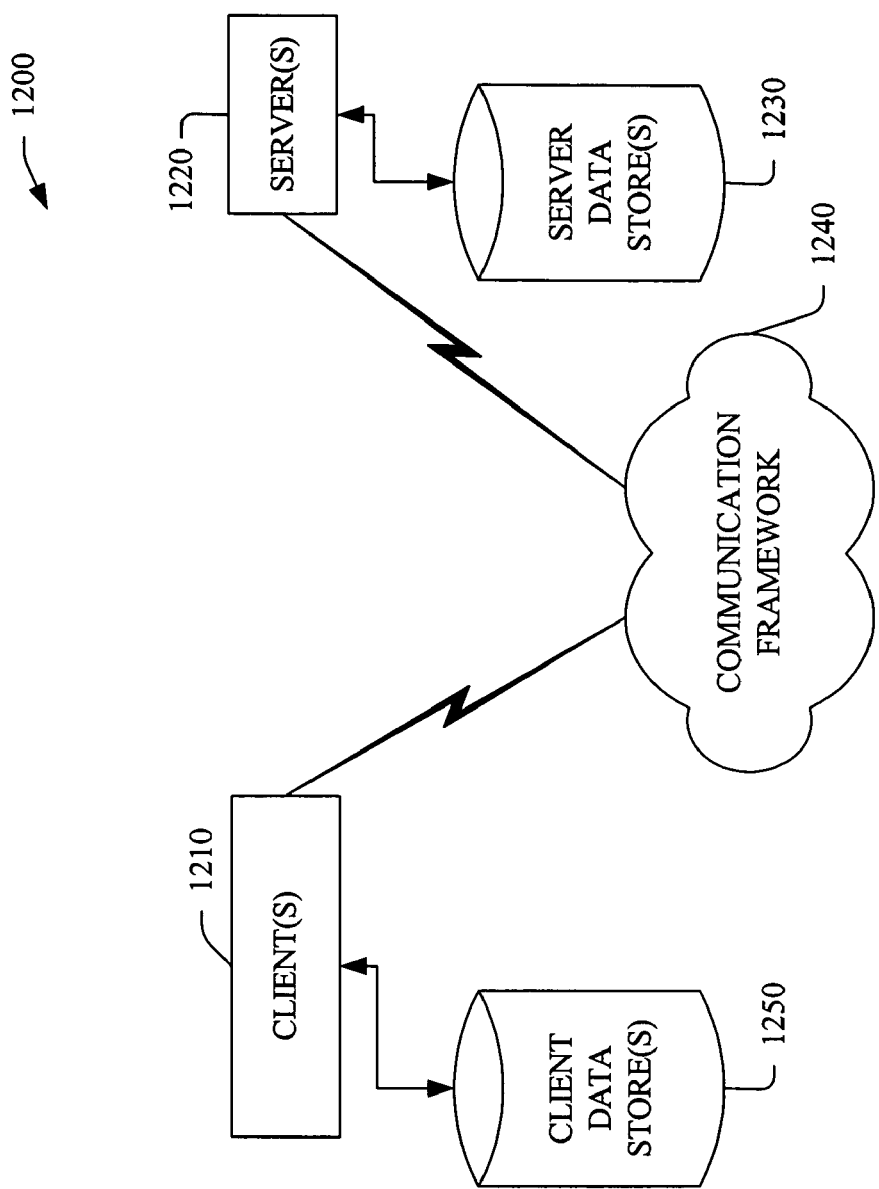
FIG. 12 illustrates an exemplary networking environment that can be employed in connection with the novel aspects of the invention.

In order to provide a context for the various aspects of the invention, FIGS. 11 and 12 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 with which the present invention can interact. The system 1200 includes one or more client(s) 1210. The client(s) 1210 can be hardware and/or software (e.g., threads, processes, computing devices). The system 1200 also includes one or more server(s) 1220. The server(s) 1220 can also be hardware and/or software (e.g., threads, processes, computing devices). The servers 1220 can house threads to perform transformations by employing the present invention, for example.

One possible communication between a client 1210 and a server 1220 can be in the form of a data packet adapted to be transmitted between two or more computer processes. The system 1200 includes a communication framework 1240 that can be employed to facilitate communications between the client(s) 1210 and the server(s) 1220. The client(s) 1210 are operably connected to one or more client data store(s) 1250 that can be employed to store information local to the client(s) 1210. Similarly, the server(s) 1220 are operably connected to one or more server data store(s) 1230 that can be employed to store information local to the servers 1240.

As used in this application, the term "component" is intended to refer to a computer-related entity, either hardware, a combination of hardware and software, software, or software in execution. For example, a component can be, but is not limited to, a process running on a processor, a processor, an object, an executable, a thread of execution, a program, and/or a computer. By way of illustration, both an application running on a server and the server can be a computer component. In addition, one or more components can reside within a process and/or thread of execution, and a component can be localized on one computer and/or distributed between two or more computers. Furthermore, a component can be an entity (e.g., within a process) that an operating system kernel schedules for execution. Moreover, a component can be associated with a context (e.g., the contents within system registers), which can be volatile and/or non-volatile data associated with the execution of the thread.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method that detects a presence of desired signals in received signals, comprising:
   receiving a signal that includes a desired signal and noise;
   estimating the noise by estimating a noise model, the noise model is determined via minima tracking and previous detection of desired signals;
   utilizing the received signal and the estimated noise to generate a feature set that comprises a concatenation of features, each feature associated with an atom in a frame, each atom referenced by a frequency/time pair, wherein at least one of the features comprises at least one estimated SNR;
   employing a convolutional neural network for utilizing the concatenation of the features in the feature set to estimate a frame level posterior probability that is utilized to determine whether the desired signal is present in the received signal; and
   applying a threshold to the estimated frame level posterior probability to render a decision whether the desired signal is present in the received signal.

2. The method of claim 1, further comprising estimating a plurality of atom level posterior probabilities for each of the atoms and utilizing the plurality of atom level posterior probability estimates to determine the frame level posterior probability estimate.

3. The method of claim 1, further comprising utilizing the frame level posterior probability estimate to generate a noise model.

4. The method of claim 3, further comprising utilizing the frame level posterior probability estimate and the noise model to enhance the desired signal.

5. A system for enhancing a speech signal, comprising:
a receiver that receives a signal comprising a desired speech signal and noise;
an analyzer that is provided the received signal and utilizes the received signal to generate a concatenation of atom level or frame level estimated posterior signal-to-noise ratios associated with a frame;
a discriminator that is provided the concatenation of signal-to-noise ratios and estimates a posterior probability that speech is present in the received signal by employing at least one of a convolutional neural network or a logistic regression model;
a model generator that receives the estimated posterior probability and utilizes the estimated posterior probability to either create a noise model or refine an existing noise model; and
a logic unit that receives the new or existing noise model and the signal and provides an estimate of a clean speech signal, thereby enhances the speech signal, and outputs the enhanced speech signal.

6. The system of claim 5, wherein the noise model provides an estimation of noise for computing the estimated signal-to-noise ratios.

7. The system of claim 6, wherein the noise model is a two-level online automatic noise tracker, wherein an initial noise estimate is bootstrapped via a minima tracker and a maximum estimate of the noise is obtained.

8. A system that facilitates enhancing a speech signal, comprising:
a processor; and
a memory communicatively coupled to the processor, the memory having stored therein computer-executable instructions configured to implement the speech signal enhancing system including:
a receiver that receives a signal comprising a desired speech signal and noise;
an analyzer that is provided the received signal and utilizes the received signal to generate a concatenation of atom level or frame level estimated posterior signal-to-noise ratios associated with a frame;
a discriminator that is provided the concatenation of signal-to-noise ratios and estimates a posterior probability that speech is present in the received signal by employing at least one of a convolutional neural network or a logistic regression model;
a model generator that receives the estimated posterior probability and utilizes the estimated posterior probability to either create a noise model or refine an existing noise model; and
a logic unit that receives the new or existing noise model and the signal and provides an estimate of a clean speech signal, thereby enhances the speech signal, and outputs the enhanced speech signal.

9. A method that detects a presence of desired signals in received signals, comprising:
employing a processor executing computer executable instructions stored on a computer readable storage medium to implement the following acts:
receiving a signal that includes a desired signal and noise;
estimating the noise by estimating a noise model, the noise model is determined via minima tracking and previous detection of desired signals;
utilizing the received signal and the estimated noise to generate a feature set that comprises a concatenation of features, each feature associated with a frequency/time pair selected from multiple frames, wherein at least one of the features comprises at least one estimated SNR;
employing a convolutional neural network for utilizing the concatenation of the features in the feature set to estimate a frame level posterior probability that is utilized to determine whether the desired signal is present in the received signal; and
applying a threshold to the estimated frame level posterior probability to render a decision whether the desired signal is present in the received signal.

10. The method of claim 9, further comprising estimating a plurality of atom level posterior probabilities and utilizing the plurality of atom level posterior probability estimates to determine the frame level posterior probability estimate.

11. The method of claim 9, further comprising utilizing the frame level posterior probability estimate to generate a noise model.

12. The method of claim 9, further comprising utilizing the frame level posterior probability estimate and the noise model to enhance the desired signal.

13. The method of claim 9, the at least one estimated SNR comprises one of a normalized logarithmic posterior SNR (nlpSNR) and a mel-transformed nlpSNR (mel-nlpSNR).

14. The method of claim 9, the convolutional neural network is a frame level convolutional neural network.

15. The method of claim 14, further comprising a plurality of atom level discriminative classifiers that provide atom level estimates to the convolutional neural network, which utilizes the atom level estimates to estimate the presence of the desired signal in the received signal.

16. The method of claim 9, further comprising a plurality of multi-level convolutional neural networks that utilize at least one of atom level decisions, partial decisions and external features to estimate the presence of the desired signal in the received.

* * * * *